Feb. 3, 1970  K. V. VALBJORN  3,493,168
MOTOR DRIVE FOR MOTOR-COMPRESSORS WITHOUT DRIVING MOTOR SHAFT
Filed Nov. 13, 1967
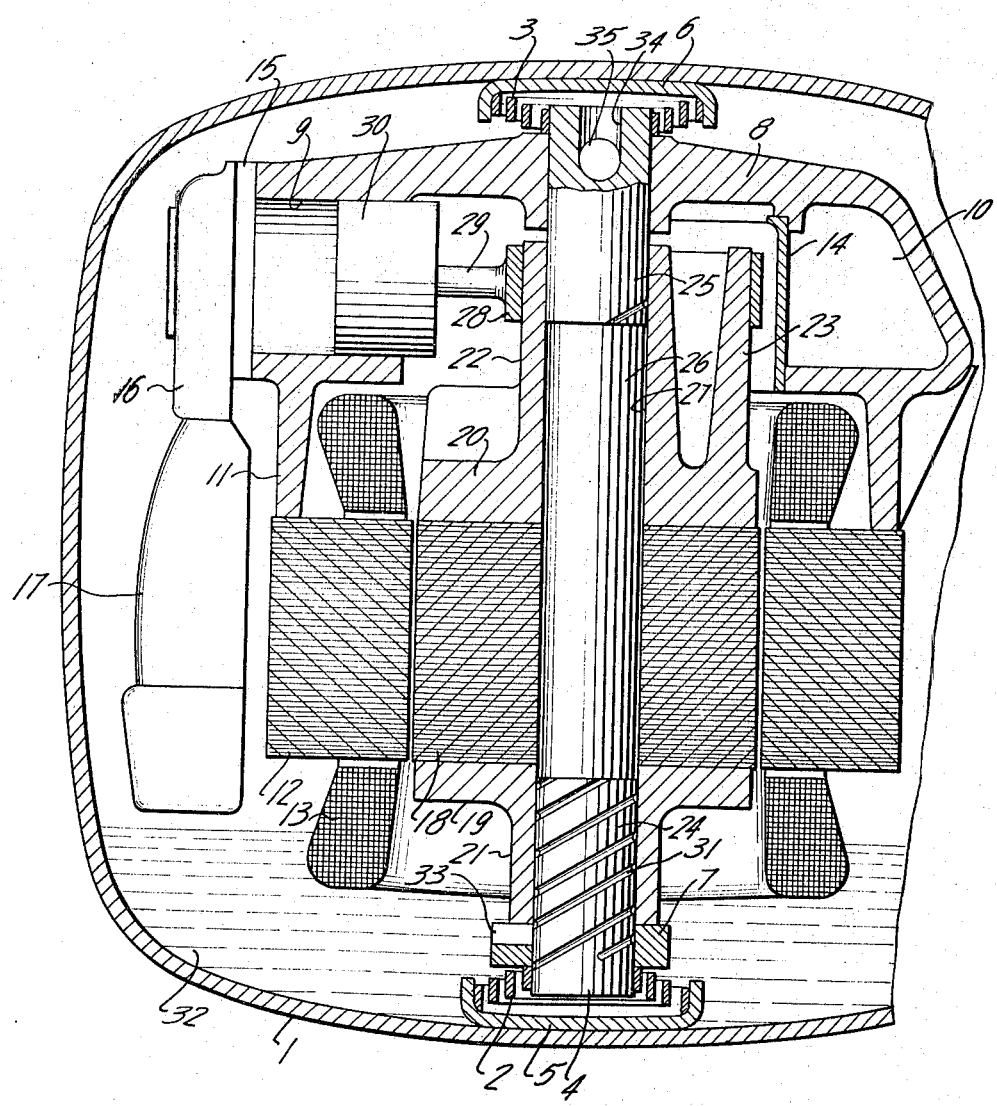

United States Patent Office 3,493,168
Patented Feb. 3, 1970

3,493,168
MOTOR DRIVE FOR MOTOR-COMPRESSORS WITHOUT DRIVING MOTOR SHAFT
Knud V. Valbjorn, Nordborg, Denmark, assignor to Danfoss A/S, Nordborg, Denmark, a company of Denmark
Filed Nov. 13, 1967, Ser. No. 682,421
Claims priority, application Germany, Nov. 12, 1966, D 51,539
Int. Cl. F04b 35/04
U.S. Cl. 230—58                             5 Claims

ABSTRACT OF THE DISCLOSURE

A motor drive for motor-compressors in which the piston in the compressor cylinder is reciprocably driven by a direct drive from a rotor of an electric motor. The rotor has an axial extension eccentric to the longitudinal axis of the rotor to which the piston connecting rod is connected for reciprocable driving of the compressor piston therefrom. The motor constituting the drive is without a conventional driving motor shaft and without conventional cranks.

---

This invention relates generally to motor-compressors and more particularly to a drive for a compressor in a motor-compressor.

In the usual motor-compressor having a cylinder in which a piston is reciprocably driven the motor shaft is generally provided with an eccentric crankpin on which is mounted the crank bearing of the piston. This type of construction is accompanied by various difficulties in the construction thereof. The crankpin must be formed on the motor shaft or subsequently fixed thereon which calls for additional material and manufacturing operations. Furthermore, the operations including assembly are difficult particularly when the crankpin has to be positioned between two bearings.

It is a principal object of the present invention to provide a drive construction for piston-type motor-compressors which is simpler to design, less expensive to manufacture and more readily assembled.

A feature of the invention is that the drive according to the invention may eliminate the usual electric motor drive shaft. The member taking the place of the motor shaft may be replaced by a cylindrical member free of the crank connections and can thus be readily manufactured and easily assembled with the motor rotor. The motor shaft or any member corresponding therewith may be totally eliminated. For example, the motor can be mounted on a fixed column by an eccentric extension. No problem exists for providing such an extension on the rotor since the entire cross sectional area thereof is available for this purpose.

A particular advantageous construction of the invention is to form the crankpin of the drive mechanism as an axial extension of the short-circuit ring of the rotor. The rotor is normally provided with an injection-molded cage and the short-circuit rings thereon are formed by injection-molding. These rings can be made to any desired shape beforehand. The material from which the short-circuit rings are generally made is of a metal that can serve directly as a bearing metal so that these rings can function as rotor bearings and the axial extension thereon for driving connection to the compressor piston can have its bearing surfaces machined or ground at the same time the rotor surfaces defining the motor air gap are ground.

On the other hand if the metal from which the axial extension on the short-circuit ring is not suitable as a bearing metal surface a ring made of bearing metal may be mounted thereon. The ring can be made integrally with the rotor axial extension by casting or injection-molding or it may be subsequently mounted thereon.

An advantage of the drive connection according to the invention is that the axial extension can be made in any desired dimension so that it can be made as rigidly as desired. Thus the invention provides a construction usable for single-piston or multi-piston compressors in which two or more pistons successively engage the same crankpin.

Other features and advantages of the motor-compressor unit provided with a drive according to the present invention will be better understood as described in the following specification and appended claims, in conjunction with the drawing in which a fragmentary vertical longitudinal section view of a motor-compressor unit provided with a drive according to the invention is illustrated.

As illustrated in the drawing a refrigerant motor-compressor unit comprises a hermetic capsule 1 in which two suspension mounts comprising conical springs 2, 3 mount a substantially stationary shaft or pedestal 4 held in the housing by means of the two conical spiral springs 2 and 3. The suspension systems and mounts have springs capable of damping radial as well as axial deflections of the pedestal 4. Each spring is arranged in a cupped element 5 and 6 respectively secured to the capsule and supports a part positively connected to the pedestal 4. The lower spring 2 supports a stop ring or collar 7 fitted on the pedestal, while the upper spring supports a component or casting 8 in which a cylinder 9 and cavities 10, constituting silencer chambers, are provided. The casting is provided with downward extensions 11 which carry a stator 12 with a coil 13. The stationary parts of the motor-compressor further comprise a cover plate 14 closing the silencer cavities 10, a valve plate 15 on the cylinder and a cylinder head 16. The cylinder head communicates with a pressure silencer chamber 17. The cup-like shape of the casting 8 enables the various components thereof to be cast in one piece, with a dead core. The dead core can easily be removed, after casting, through the large inner space.

An electrical motor rotor 18 is provided with an injection-molded metal cage of which only two shading or short-circuit rings 19 and 20 appear in the drawing. The lower shading ring 19 has an extension in the form of a sleeve-like hub 21. The upper shading ring 20 has an extension in the form of a sleeve-like hub 22 and also extends into a crankpin configuration 23. The shading rings serve as bearings at the same time. The hubs 21, 22 run on bearing sections or journals 24 and 25 of the pedestal 4. The intervening or intermediate section 26 of the pedestal is of reduced diameter, so that an annular or cylindrical space 27 is defined between the rotor and the pedestal. The crankpin 23 engages a crank bearing 28, which is operatively associated with a piston 30 by means of a connecting rod 29.

On the lower bearing section 24 of the pedestal 4 a helical groove 31 is provided which, in cooperation with the hub 21, acts as an oil pump. Oil is supplied from a sump 32 through a port 33 in the stop ring 7 and lubricates the bearings 21, 23 directly, then is taken through the annular gap or space 27 to the bearing and journal 25, 22 and, from there, in the usual way to the cylinder.

The upper end of the pedestal has a bore 34 which serves as a suction port for the refrigerant gas present in the housing or capsule 1. A transverse bore 35 leads from this point into one of the suction silencer cavities or chambers 10.

The assembly of a motor-compressor unit of this type is very simple. First, the casting 8 with the stator and the piston 30 inserted in the cylinder is attached to the pedestal 4. Then the rotor 18 is slipped on from below in such a way that the crankpin 23 engages the crank bearing 28. The rotor is finally secured in an axial position by slipping on the stop ring 7. Now the springs 2 and 3 with their mount cups 5 and 6 are slipped over the ends of the pedestal and the whole assembly is placed in the capsule 1. The customary accessories such as electrical supply cables with lead-through, suction ports, pressure pipes with a pressure port etc. have not been shown for clarity's sake.

The embodiment of the crankpin 23 illustrated as an axial extension of the short-circuit or shading ring 20 can also be used in constructions of the present type machine in which the stator is internally of the rotor as illustrated in my copending application Ser. No. 674,815 filed Oct. 12, 1967.

The rotor 18 can be constructed with a motor shaft extending axially therethrough which is supported by bearings at two points, for example near the ring 7 and the casting component 8. It can be seen that the crankpin 23 is sufficiently rigid so that it can be made with a fairly great length to accommodate a plurality of crank bearings, not shown, such as cranking bearing 28 for use on a compressor, not shown, having a multiplicity of pistons.

If the material from which the shading or short-circuit rings are made is not a suitable bearing material particularly if the ring 20 should be made of a material having poor frictional properties a ring of bearing metal can be applied, for example by injection for the crank bearing 28. The axial extension thus has a suitable bearing surface whether provided by the material from which it is made or the above-mentioned bearing metal ring, not shown.

While the compressor drive according to the invention has been illustrated as applied to single-piston refrigerant compressors it is useable in motor-compressors other than hermetic or refrigerant compressors and on multi-piston compressors as heretofore mentioned.

While a preferred embodiment of the invention has been shown and described it will be understood that many modifications and changes can be made within the true spirit and scope of the invention.

What I claim and desire to be secured by Letters Patent is:

1. In a motor-compressor, in combination, a compressor having a cylinder and a piston reciprocable therein, a motor having a rotor comprising a short-circuit ring having an eccentric axial extension defining a crankpin, and means connecting said crankpin to said piston for reciprocable driving of said piston.

2. In a motor-compressor according to claim 1, in which said axial extension is disposed in an upstanding position.

3. In a motor-compressor according to claim 1, in which said axial extension is coaxial with a longitudinal axis of rotation of said rotor.

4. In a motor-compressor according to claim 1, in which said rotor axial extension comprises an external bearing surface, and said means connecting said crankpin to said piston comprises a bearing on said bearing surface.

5. In a motor-compressor according to claim 1, including a shaft about which said rotor is circumferentially disposed, said shaft being disposed axially in said rotor said short-circuit ring being disposed circumferentially of said shaft.

References Cited

UNITED STATES PATENTS

| | | | |
|---|---|---|---|
| 2,043,215 | 6/1936 | Smith et al. | 230—58 |
| 2,905,372 | 9/1959 | La Flame | 230—58 |

ROBERT M. WALKER, Primary Examiner